Sept. 9, 1924.                    1,508,324
W. R. HELSEL
VEHICLE SPRING EQUALIZER
Filed Jan. 8, 1924
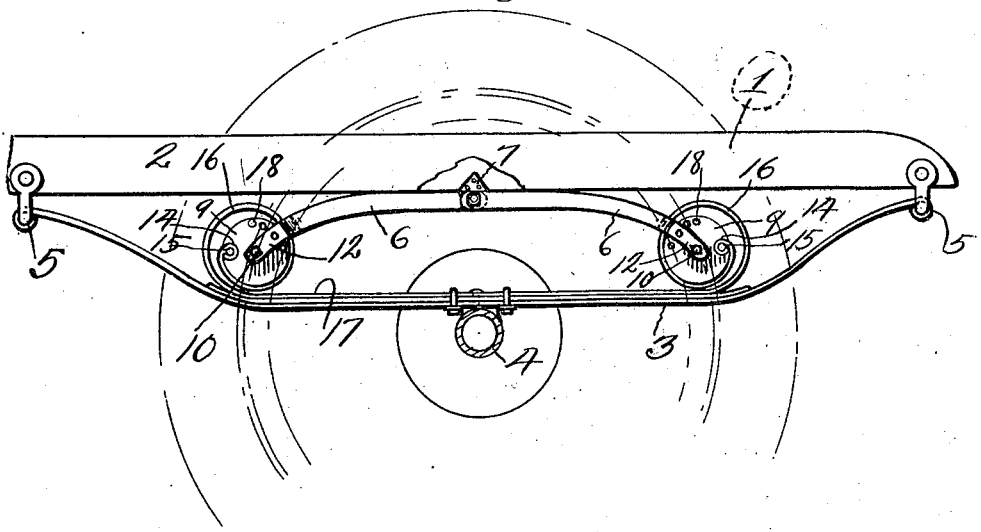
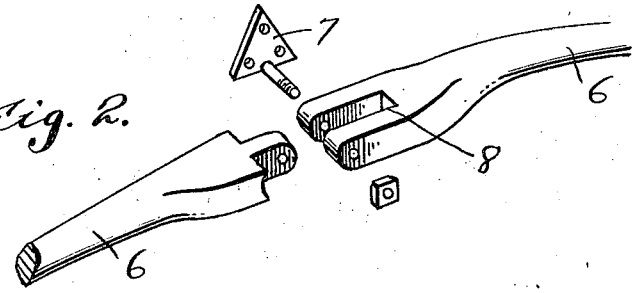
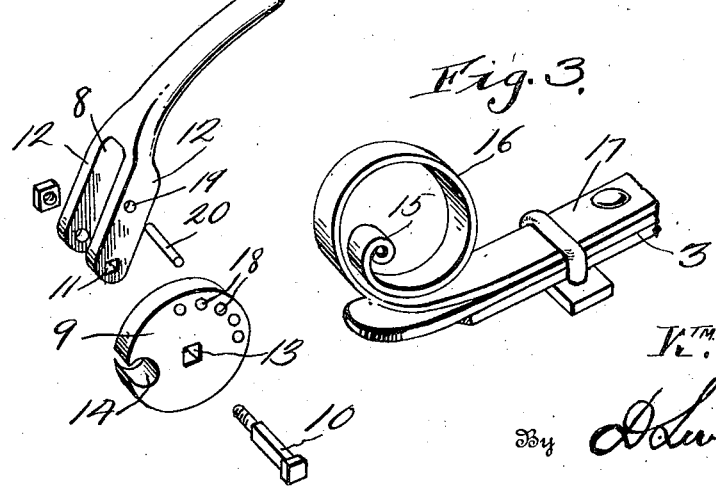
Inventor
Wm. R. Helsel
By D. Swift
Attorney Patented Sept. 9, 1924.

1,508,324

UNITED STATES PATENT OFFICE.

WILLIAM R. HELSEL, OF HUNTINGDON, PENNSYLVANIA.

VEHICLE SPRING EQUALIZER.

Application filed January 8, 1924. Serial No. 685,001.

*To all whom it may concern:*

Be it known that I, WILLIAM R. HELSEL, a citizen of the United States, residing at Huntingdon, in the county of Huntingdon, State of Pennsylvania, have invented a new and useful Vehicle Spring Equalizer; and I do hereby declare the following to be a full, clear, and exact description of the invention, such as will enable others skilled in the art to which it appertains to make and use the same.

The invention relates to vehicle spring equalizers particularly adapted for use in connection with automobile springs, and has for its object to provide a device of this character whereby upon the bound and rebound movement of the axle of the vehicle, the frame weight on the vehicle spring will be equally distributed, and on the bound a snubbing action will take place on the spring at spaced points from the axle at opposite sides of the axle, thereby absorbing the shock.

A further object is to provide adjustable means whereby the force of the snubbing action may be varied and adjusted according to the desired snubbing action and the type of spring to which the equalizer is applied.

A further object is to form the device from arms having their adjacent ends pivoted to the under side of the side rails of the chassis of an automobile, which arms having their outer ends disposed over the vehicle spring at opposite sides of the axle and mounted therein discs, to which discs the ends of coiled portions of a spring secured to the upper side of the vehicle spring are attached. The discs form means whereby the tension of the coiled portions of the spring may be varied according to the type of vehicle spring, to which the device is applied and to the desired snubbing action.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the device showing the same applied to a conventional form of automobile and spring.

Figure 2 is a collective view of the various parts of the adjustable discs and the pivotally connected arms showing the parts in position to be assembled.

Figure 3 is a perspective view of one end of the spring which carries the coiled springs, showing one of said coiled springs.

Referring to the drawing, the numeral 1 designates the chassis of a conventional form of automobile, and 2 one of the side rails thereof. Disposed beneath the rail 1 is a longitudinally extending semielliptic spring 3, which spring is supported on the axle 4 of the automobile and has its ends connected in the usual manner at 5 to the rail 1. It has been found that springs of this character take up ordinary shock when the vehicle is going over comparatively smooth ground. However it has been found that when the vehicle is going over rough ground, the spring does not absorb the sudden shocks on the bound and rebound action, as the spring has an excessive flexing action intermediate its ends and the action. To obviate the above difficulties the arms 6 are provided, which arms have their inner adjacent ends pivoted together on a plate 7, which is secured to the rail 2. The arms 6 extend away from each other and curve downwardly at opposite sides of the axle 4 and in substantially the same plane as the semi-elliptic spring 3 and the rail 2, and terminate in bifurcations. Disposed within the bifurcations 8 of the arms 6 are discs 9, which discs are mounted on rectangular shaped bolts 10, which extend through similar shaped apertures 11 in the arms 12 formed by the bifurcations 8, and through rectangular shaped apertures 13 in the disc, consequently it will be seen that after the discs 9 have been rotated to the desired position, the bolts 10 will prevent rotation of the disc, the purpose of which will presently appear. Discs 9 have their peripheries provided with substantially round recesses 14, which recesses receive the rolls 15 of the coiled ends 16 of the leaf spring 17 and hold as ends in any position to which they may be moved for adjusting the tension of the coiled ends 16 of the leaf spring 17, whereby the tension may be regulated and the pressure on the semielliptic spring varied as desired, according to the flexing strength of the elliptic spring 3. It will be noted that pressure will be applied to the semielliptic spring at points intermediate its ends and the axle 4 of the vehicle, and consequently shocks incident to the bound and rebound will be absorbed. Upon the downward movement of the chassis 1, incident to a shock absorbing operation, it will be seen that the central pivotal point of the arm 6 will be forced downwardly towards a horizontal line extending through the centers of the discs 9, and consequently said discs will be forced outwardly, thereby contracting the coils 16, and increasing the tension thereof, and the greater the bound, the greater the tension, and consequently excessive shocks are immediately absorbed.

From the above it will be seen that an automobile spring equalizing and shock absorbing device is provided, wherein the greater the shock, during the bound and rebound operation, the greater the tension, applied on the semielliptic spring at points between the axle and the ends of the spring. It will also be seen that by providing the adjustable discs 9 that the tension of the coiled portions 16 of the leaf spring 17 may be varied. Discs 19 are provided with a plurality of concentrically arranged apertures 18, which are adapted to register with apertures 19 in one of the arms 12 of the members 6 for further holding the discs 9 against rotation and in adjusted position, and particularly when the discs have been adjusted and the bolts 10 are being placed in position.

The invention having been set forth what is claimed as new and useful is:—

1. The combination with a semielliptic spring having its ends anchored, the side rail of a chassis, an axle carried by said spring, of an equalizing device for said spring, said device comprising a pair of arms extending in opposite directions and pivoted to the chassis rail above the axle, discs disposed in bifurcations in the ends of said arms, means whereby said discs may be rotated to various positions and held against rotation, coiled springs carried by the semielliptic spring intermediate the axle and the ends of the semielliptic spring, the ends of the coiled springs being attached to the discs, said discs being disposed within the convolutions of the coiled springs.

2. The combination with a semielliptic spring, an axle carried by said spring, an automobile chassis rail above said spring and to which the ends of the spring are anchored, a shock absorbing device, said device comprising oppositely extending arms pivotally connected to the rail, discs disposed in bifurcations of the ends of the arms means for holding said disc in various adjusted positions and against rotation, said means comprising a rectangular shaped bolt extending through the bifurcation and disc, coiled springs carried by the upper side of the semielliptic spring intermediate the axle and its ends, the ends of the coiled springs terminating in rolls disposed in recesses in the discs, said discs being disposed within the convolutions of the coiled springs.

In testimony whereof I have signed my name to this specification in the presence of two subscribing witnesses.

WILLIAM R. HELSEL.

Witnesses:
W. GRAFFINS MILLER,
C. G. BRUMBAUGH.